United States Patent
Pohjolainen et al.

(10) Patent No.: US 8,316,132 B2
(45) Date of Patent: Nov. 20, 2012

(54) METHOD TO DETERMINE THE COMPLETENESS OF A SERVICE GUIDE

(75) Inventors: Topi Pohjolainen, Helsinki (FI); Martin Jansky, Espoo (FI); Toni Paila, Degerby (FI)

(73) Assignee: Nokia Corporation, Espoo (FI)

( * ) Notice: Subject to any disclaimer, the term of this patent is extended or adjusted under 35 U.S.C. 154(b) by 1289 days.

(21) Appl. No.: 11/220,724

(22) Filed: Sep. 8, 2005

(65) Prior Publication Data

US 2007/0055786 A1 Mar. 8, 2007

(51) Int. Cl.
*G06F 15/16* (2006.01)
(52) U.S. Cl. ........................................ 709/227
(58) Field of Classification Search .................... 709/227
See application file for complete search history.

(56) References Cited

U.S. PATENT DOCUMENTS

| | | | |
|---|---|---|---|
| 6,249,844 B1 * | 6/2001 | Schloss et al. ................ | 711/122 |
| RE39,184 E * | 7/2006 | Schloss et al. ................ | 711/122 |
| 7,152,098 B2 * | 12/2006 | Khang ........................ | 709/219 |
| 7,428,553 B2 * | 9/2008 | Shin ........................... | 1/1 |
| 2003/0211856 A1 | 11/2003 | Zilliacus | |
| 2006/0059090 A1 * | 3/2006 | Lahtinen et al. ............... | 705/50 |
| 2006/0064467 A1 * | 3/2006 | Libby ......................... | 709/217 |
| 2006/0123097 A1 * | 6/2006 | Paila et al. ................... | 709/218 |
| 2006/0123099 A1 * | 6/2006 | Paila et al. ................... | 709/217 |
| 2006/0195546 A1 * | 8/2006 | Hulse et al. ................... | 709/217 |
| 2006/0206906 A1 * | 9/2006 | Brooks et al. ................. | 719/330 |
| 2006/0225093 A1 * | 10/2006 | Huttunen et al. ............... | 725/39 |
| 2006/0253544 A1 * | 11/2006 | Luoma et al. .................. | 709/217 |
| 2006/0265727 A1 * | 11/2006 | Vermola ....................... | 725/56 |

FOREIGN PATENT DOCUMENTS

| | | |
|---|---|---|
| EP | 0551433 | 7/1993 |
| GB | 2396228 A | 6/2004 |
| WO | WO03/032148 | 4/2003 |
| WO | WO03/034735 | 4/2003 |
| WO | WO2004/015917 | 2/2004 |

OTHER PUBLICATIONS

Open Mobile Alliance, Service Guide for Mobile Broadcast Services, Jun. 3, 2005, Draft Version 1.0, pp. 1-40.*
Service Guide for Mobile Broadcast Services; Sep. 2, 2005, pp. 1-64, Draft Version 1.0; Open Mobile Alliance, Ltd.
U.S. Appl. No. 10/917,700, filed Aug. 18, 2004.
Open Mobile Alliance, Service Guide for Mobile Broadcast Services, Draft Version 1.0, OMA-TS-BCAST_ServiceGuide—V1_0_0-20050818-D, Aug. 18, 2005.

(Continued)

*Primary Examiner* — Alicia Baturay
(74) *Attorney, Agent, or Firm* — Ditthavong Mori & Steiner, P.C.

(57) ABSTRACT

Provided are apparatuses and methods in a digital broadcast transmission system for deducing the contents or topology of an ESG fragment, transport object, container or session. In one example, descriptors may be transmitted on a first channel that may correspond to ESG fragments transmitted on a second channel. The first and second channel can be received at a subscriber terminal. The subscriber terminal may thus be apprised of the topology of the ESG fragments to minimize the amount of information the subscriber terminal needs to receive. This provides an optimized overall retrieval of the ESG fragments.

32 Claims, 9 Drawing Sheets

OTHER PUBLICATIONS

Korean Office Action for corresponding KR Application No. 10-2008-7007459, Nov. 27, 2009, Korea.
DVB Organization, "tm-cbms1199_ESGSpec_050809v7clean. doc", DVB, Digital Video Broadcasting, c/o EBU—17A Ancienne Route—CH01218 Grand Saconnex, Geneva—Switzerland, Aug. 17, 2005, XP017805568.
DVB Organization, "tm-cbms1213.doc", DVB, Digital Video Broadcasting, c/o EBU—17A Ancienne Route—CH-1218 Saconnex, Geneva—Switzerland, Mar. 17, 2005, XP017804593.
DVB Organization, "tm-cbms1225.doc", DVB, Digital Video Broadcasting, c/o EBU—17A Ancienne Route—CH-1218 Grand Saconnex, Geneva—Switzerland, Mar. 17, 2005, XP017804596.
DVB Organization, "tm-cbms1275-multisession vs. single ESG session study.doc", DVB, Digital Video Broadcasting, c/o EBU—17A Ancienne Route—CH-1218 Grand Saconnex, Geneva—Switzerland, May 5, 2005, Xp017804620.
Supplementary European Search Report for related European Patent Application No. 06795428 dated Dec. 21, 2011, pp. 1-7.

* cited by examiner

METHOD TO DETERMINE THE COMPLETENESS OF A SERVICE GUIDE

FIELD OF THE INVENTION

The invention relates generally to communications networks. More specifically, the invention provides for determining the contents or completeness of a service guide in a broadcast communication network

BACKGROUND OF THE INVENTION

Generally, an Electronic Service Guide (ESG) enables a terminal to communicate what services are available to end users and how the services may be accessed. ESG fragments are independently existing pieces of the ESG. Traditionally, ESG fragments comprise XML documents, but more recently they have encompassed a vast array of items, such as for example, a SDP (Session Description Protocol) description, textual file, or an image. The ESG fragments describe one or several aspects of currently available (or future) service or broadcast program. Such aspects may include for example: free text description, schedule, geographical availability, price, purchase method, genre, and supplementary information such as preview images or clips. Audio, video and other types of data comprising the ESG fragments may be transmitted through a variety of types of networks according to many different protocols. For example, data can be transmitted through a collection of networks usually referred to as the "Internet" using protocols of the Internet protocol suite, such as Internet Protocol (IP) and User Datagram Protocol (UDP). Data is often transmitted through the Internet addressed to a single user. It can, however, be addressed to a group of users, commonly known as multicasting. In the case in which the data is addressed to all users it is called broadcasting. The ESG data may be transmitted using different types of wireless digital networks including digital broadband broadcast and/or multicast networks.

ESG fragments may be instantiated using a syntax such as XML and may include content including metadata and descriptions of services. Typically, the content of the ESG fragment does not provide information indicating the identity of the contents. Hence, when a subscriber terminal receives the ESG fragment, the subscriber terminal does not deduce the contents of the ESG fragment. For example, the subscriber terminal does not have information regarding the organization of the content in the ESG fragment or an indication of how the content of the ESG fragment may be retrieved. Also, the subscriber terminal does not have information regarding the specific content. Due to this lack of information, the subscriber terminal may not know what ESG fragment data it already has and may thus re-store data that it already has. This leads to a waste of resources.

Thus, there exists a need for a method and system for identifying the content of ESG fragments in an efficient manner. There is also a need for a method and system in which a subscriber terminal may receive information, such as organization of content in an ESG fragment so that retrieval of data in the ESG fragment can be optimized.

BRIEF SUMMARY OF THE INVENTION

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

In one example of the present invention, a transmitter is provided for transmitting ESG fragments in a broadcast system. The transmitter may send descriptors, such as Service Guide Delivery Descriptors (SGDDs) associated with transmitted ESG fragments. The descriptors may describe the topology of the ESG fragments by which a subscriber terminal or receiver may be informed of the contents of the ESG fragments.

In another example of the present invention, a receiver is provided for receiving ESG fragments and descriptors in a broadcast system. For example, a receiver or subscriber terminal can receive an ESG fragment and associated descriptors. The descriptors can be included in a File Delivery Table (FDT) which can be transmitted on a first channel such as an announcement channel. The ESG fragments can be transmitted on a second channel such as a delivery channel. The descriptors transmitted in the first channel can provide information on the topology of the ESG fragments transmitted on the second channel.

In another example of the present invention, a method for receiving ESG fragments is provided in which descriptors associated with ESG fragments may be received with the ESG fragments. The descriptors may be compared to stored descriptors which may correspond to previously received ESG fragments. ESG fragments or portions of the ESG fragments may be received in the transmission or stored in memory based on comparison of the descriptors of the received ESG fragments to corresponding descriptors stored in memory. Also, ESG fragments in memory may be updated and stored in memory based on the comparison of the descriptors of the received ESG fragments to corresponding descriptors stored in memory.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Figure 1:
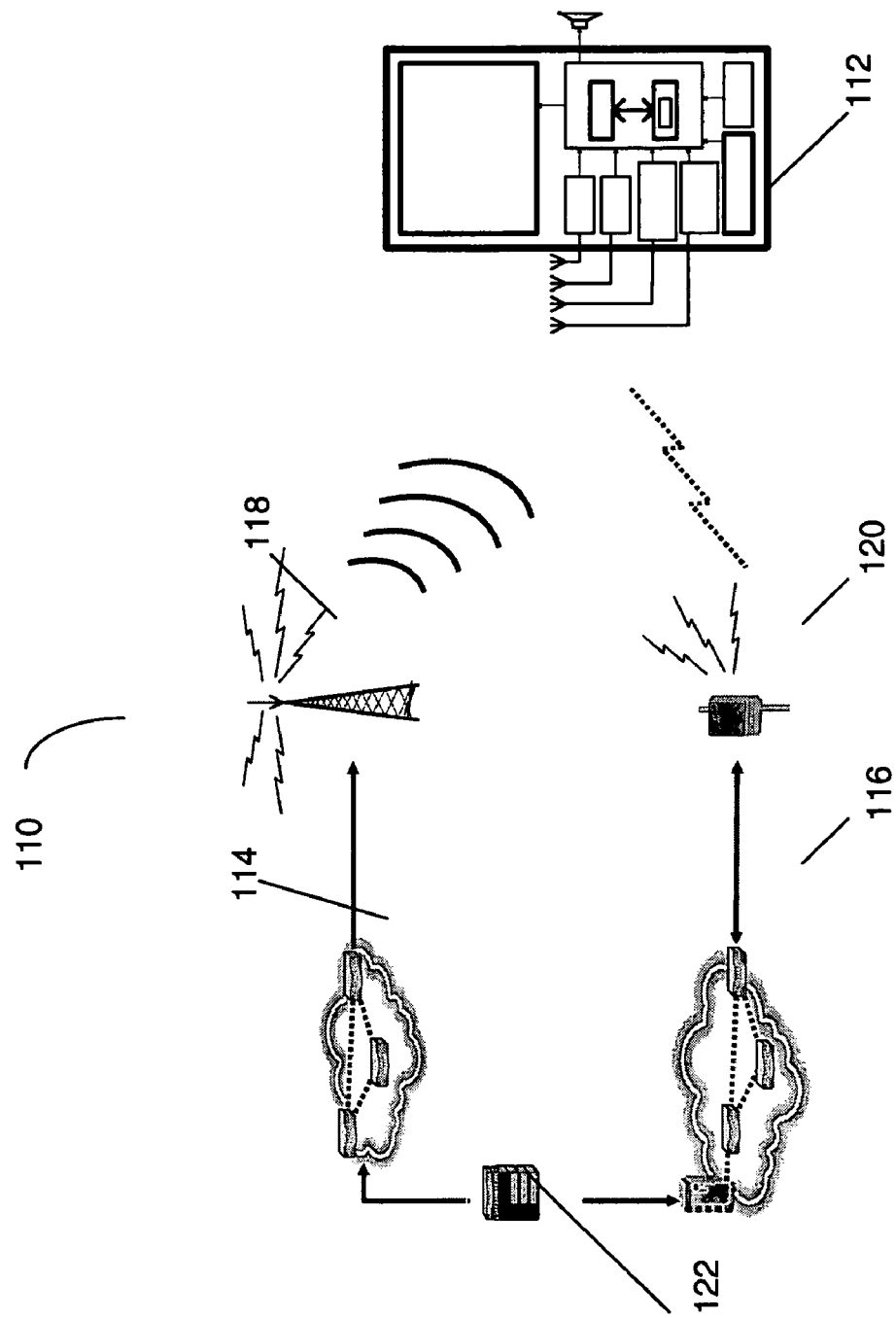
FIG. 1 illustrates a block diagram of a wireless communication system in which various aspects of the present invention may be implemented.

The present invention may be utilized across a broad array of networks and communication protocols. FIG. 1 illustrates an example of a wireless communication system 110 in which the systems and methods of the invention may be employed. One or more network-enabled mobile devices 112, such as a personal digital assistant (PDA), cellular telephone, mobile terminal, personal video recorder, portable television, personal computer, digital camera, digital camcorder, portable audio device, portable radio, or combinations thereof, are in communication with a service source 122 through a broadcast network 114 and/or cellular network 116. The mobile terminal/device 112 may comprise a digital broadcast receiver device. The service source 122 may be connected to several service providers that may provide their actual program content or information or description of their services and programs to the service source that further provides the content or information to the mobile device 112. The several service providers may include but are not limited to one or more television and/or digital television service providers, AM/FM radio service providers, SMS/MMS push service providers, Internet content or access providers.

One way of broadcasting data is to use an IP datacasting (IPDC) network. IPDC is a combination of digital broadcast and Internet Protocol. Through such an IP-based broadcasting network, one or more service providers can supply different types of IP services including on-line newspapers, radio, and television. These IP services are organized into one or more media streams in the form of audio, video and/or other types of data. To determine when and where these streams occur, users refer to an electronic service guide (ESG). One example used in digital video broadcasting (DVB) streams is an electronic program guide (EPG). One type of DVB is Digital video broadcasting-handheld (DVB-H), a recently developed technology that increases the capabilities and services available on small handheld devices, such as mobile telephones. The DVB-H is designed to deliver 10 Mbps of data to a battery-powered terminal device.

DVB transport streams deliver compressed audio and video and data to a user via third party delivery networks. Moving Picture Expert Group (MPEG) is a technology by which encoded video, audio, and data within a single program is multiplexed, with other programs, into a transport stream (TS). The TS is a packetized data stream, with fixed length packets, including a header. The individual elements of a program, audio and video, are each carried within packets having a unique packet identification (PID). To enable a receiver device to locate the different elements of a particular program within the TS, Program Specific Information (PSI), which is embedded into the TS, is supplied. In addition, additional Service Information (SI), a set of tables adhering to the MPEG private section syntax, may be incorporated into the TS. This enables a receiver device to correctly process the data contained within the TS.

The present invention, however, is also is applicable to other traditional digital mobile broadcast systems such as, for example, T-DAB, T/S-DMB, ISDB-T, ATSC, MediaFLO, and non-traditional systems such 3GPP MBMS and 3GPP2BCMCS.

The broadcast network 114 may include a radio transmission of IP datacasting over DVB-H. The broadcast network 114 may broadcast a service such as a digital or analog television signal and supplemental content related to the service via transmitter 118. The broadcast network may also include a radio, television or IP datacasting broadcasting network. The broadcast network 114 may also transmit supplemental content which may include a television signal, audio and/or video streams, data streams, video files, audio files, software files, and/or video games. In the case of transmitting IP datacasting services, the service source 122 may communicate actual program content to user device 112 through the broadcast network 114 and additional information such as user right and access information for the actual program content through the cellular network 116.

The mobile device 112 may also contact the service source 122 through the cellular network 116. The cellular network 116 may comprise a wireless network and a base transceiver station transmitter 120. The cellular network may include a second/third-generation (2G/3G) cellular data communications network, a Global System for Mobile communications network (GSM), a Universal Mobile Telecommunications System (UMTS) or other wireless communication network such as a WLAN network.

In one aspect of the invention, mobile device 112 may comprise a wireless interface configured to send and/or receive digital wireless communications within cellular network 116. The information received by mobile device 112 through the cellular network 116 or broadcast network 114 may include user selection, applications, services, electronic images, audio clips, video clips, and/or WTAI (Wireless Telephony Application Interface) messages. As part of cellular network 116, one or more base stations (not shown) may support digital communications with receiver device 112 while the receiver device is located within the administrative domain of cellular network 116.

Figure 2:
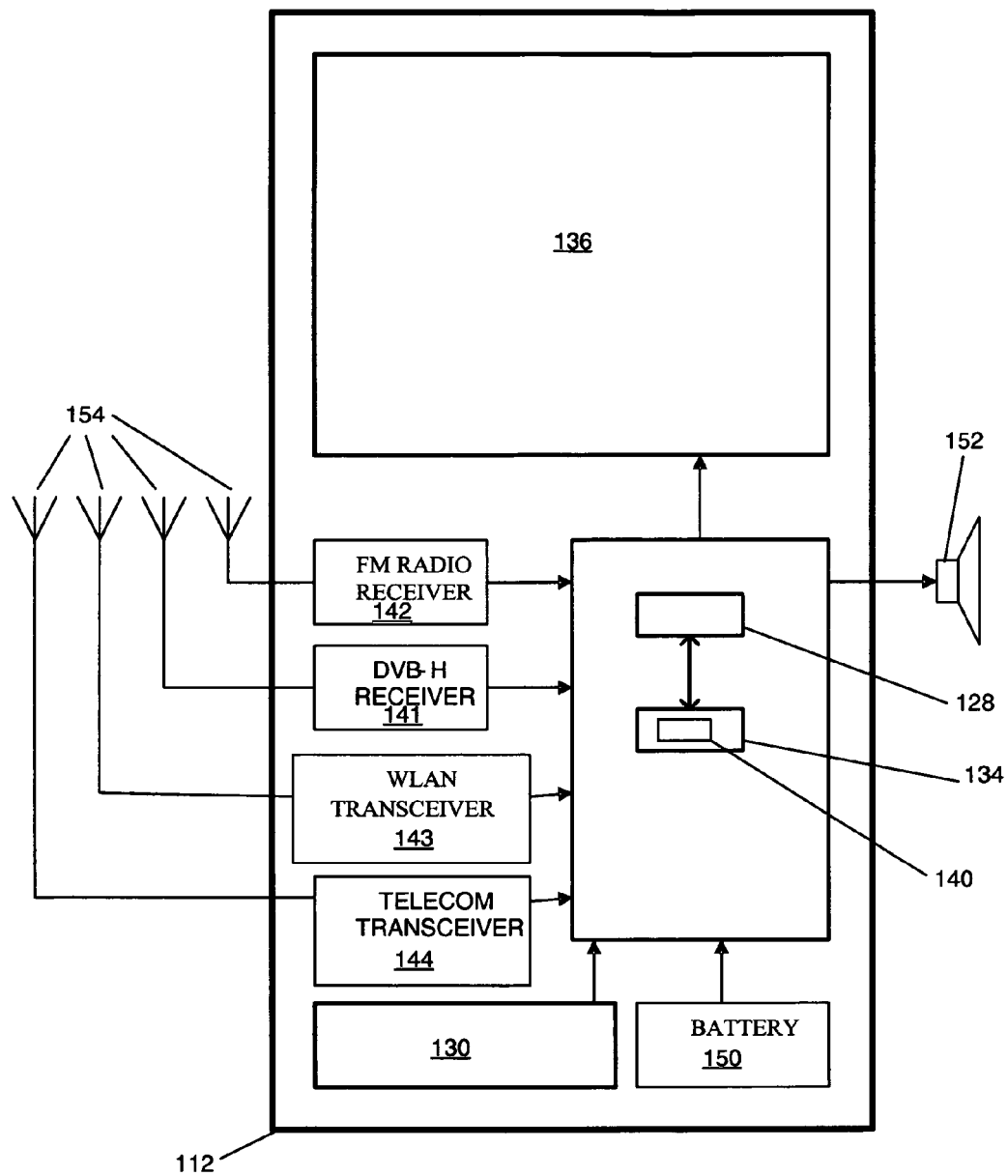
FIG. 2 illustrates a suitable digital broadcast receiver in which one or more illustrative embodiments of the invention may be implemented.

As shown in FIG. 2, mobile device 112 may include processor 128 connected to user interface 130, memory 134 and/or other storage, and display 136. Mobile device 112 may also include battery 150, speaker 152 and antennas 154. User interface 130 may further include a keypad, touch screen, voice interface, four arrow keys, joy-stick, data glove, mouse, roller ball, touch screen, or the like.

Computer executable instructions and data used by processor 128 and other components within mobile device 112 may be stored in a computer readable memory 134. The memory may be implemented with any combination of read only memory modules or random access memory modules, optionally including both volatile and nonvolatile memory. Software 140 may be stored within memory 134 and/or storage to provide instructions to processor 128 for enabling mobile device 112 to perform various functions. Alternatively, some or all of mobile device 112 computer executable instructions may be embodied in hardware or firmware (not shown).

Mobile device 112 may be configured to receive, decode and process digital broadband broadcast transmissions that are based, for example, on the Digital Video Broadcast (DVB)

standard, such as DVB-H or DVB-MHP, through a specific DVB receiver 141. The mobile device may also be provided with other types of receivers for digital broadband broadcast transmissions. Additionally, receiver device 112 may also be configured to receive, decode and process transmissions through FM/AM Radio receiver 142, WLAN transceiver 143, and telecommunications transceiver 144. In one aspect of the invention, mobile device 112 may receive radio data stream (RDS) messages.

In an example of the DVB standard, one DVB 10 Mbit/s transmission may have 200, 50 kbit/s audio program channels or 50, 200 kbit/s video (TV) program channels. The mobile device 112 may be configured to receive, decode, and process transmission based on the Digital Video Broadcast-Handheld (DVB-H) standard or other DVB standards, such as DVB-MHP, DVB-Satellite (DVB-S), DVB-Terrestrial (DVB-T) or DVB-Cable (DVB-C). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting-Terrestrial), DAB (Digital Audio Broadcasting), DMB (Digital Multimedia Broadcasting), FLO (Forward Link Only) or DIRECTV. Additionally, the digital transmission may be time sliced, such as in DVB-H technology. Time-slicing may reduce the average power consumption of a mobile terminal and may enable smooth and seamless handover. Time-slicing consists of sending data in bursts using a higher instantaneous bit rate as compared to the bit rate required if the data were transmitted using a traditional streaming mechanism. In this case, the mobile device 112 may have one or more buffer memories for storing the decoded time sliced transmission before presentation.

In one example of the present invention, ESG fragments may be delivered to a subscriber terminal in one or more data streams or channels. In this example, a plurality of channels (such as IP-packet streams) can be used to deliver ESG information to the subscriber terminal with at least one of the channels providing the subscriber terminal with information on the topology of the ESG fragments. Information on the topology of the ESG fragments may include, for example, information on the arrangement of the ESG fragment or information on the contents of the ESG fragment. The channel providing information on the topology of the ESG fragments can be referred to as an "announcement channel."

Figure 3:
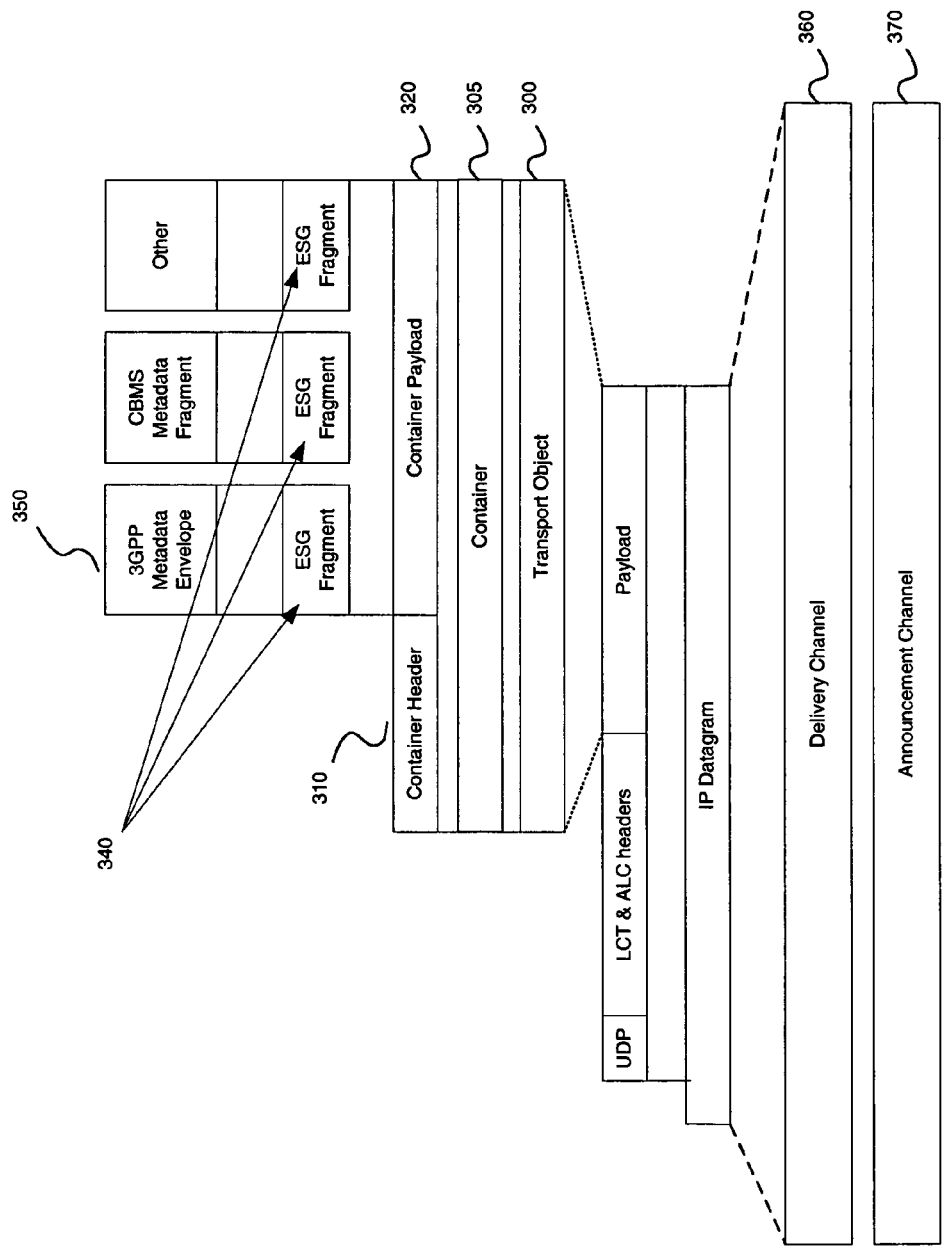
FIG. 3 illustrates a schematic diagram of an example of channels and a transport object in which one or more illustrative embodiments of the invention may be implemented.

ESG fragments may be delivered in a transport object which may transport ESG information in a container. Thus, ESG fragments may be placed in a container that may be delivered in its own transport object. The container may further include a container header and a container payload, for example, in which the container header may provide information on where each container is located within the transport object. In one example, the transport object may contain a single container or a plurality of containers, each container including at least one ESG fragment. FIG. 3 is a schematic diagram of an example transport object in accordance with at least one aspect of the present invention. As illustrated in the example of FIG. 3, a transport object 300 may comprise a container that may include a container header 310 and a container payload 320. In one example, the container header 310 and the container payload 320 are incorporated into a single container which may be incorporated into a single transport object 300 so that the container header 310 need not be recombined with information regarding where each container is located within different transported objects. Alternatively, the transport object 300 may contain a plurality of containers and a container may contain any number of ESG fragments 340. The container header 310 may contain information associated with a corresponding ESG fragment such as, for example, information regarding the container header 310 itself and/or the container payload 320.

In the example illustrated in FIG. 3, the ESG fragment 340 is contained in the container payload 320. The container header 310 may contain descriptors for identifying and describing ESG fragments in the corresponding container payload 320. Thus, the characteristics of the ESG fragment may be identified, such as but not limited to the position of the ESG fragment in the transport object 300 or the length of each contained ESG fragment 340. For example, in one embodiment, a field specifies where the particular ESG begins within the container payload 320 by providing, for example, an offset value, start and end points, or the like. In other embodiments, metadata 350 may be associated with the individual ESG fragments 340, located within or proximate to the header 310, descriptor entries, an ESG fragment 340 or a mixture thereof. In one exemplary embodiment, the association of a 3GPP metadata envelope with an ESG fragment 340 may substitute for, or negate the need of additional metadata to be located in the header 310 in relation to that particular ESG fragment.

Descriptors for identifying and describing ESG fragments may include descriptors such as Service Guide Delivery Descriptors (SGDD). SGDDs carry information on various attributes of ESG fragments such as the availability or validity of the ESG fragments. Hence, the SGDD contains data that can be used to retrieve and/or identify the associated ESG fragments. ESG fragments may also be grouped together and identified as a group by a Service Guide Delivery Unit (SGDU). Grouping of the ESG fragments may be grouped in a variety of ways. For example, the ESG fragments may be grouped together based on certain criteria. The criteria may be declared in an element or parameter such as a GroupingCriteria element of the SGDD. Hence, the SGDD can be used to specify criteria for grouping ESG fragments in a service guide in an SGDU. The criteria used to group ESG fragments can be of any variety such as but not limited to time. For example, ESG fragments corresponding to a particular period of time may be grouped together in a subgroup and identified by a corresponding SGDD. As another example, ESG fragments may be grouped based on content such as content type (e.g., comedy, action, drama, etc.).

An SGDD can also specify a pointer to a transport session for delivering corresponding ESG fragments within a SGDU. For example, an SGDD can identify the transport session based on criteria such as a destination IP address of a target delivery session, the destination port of a target delivery session, the source IP address of the delivery session, or an identifier of the target delivery session. The following table lists examples of sub-elements and attributes of the SGDD.

| Name | Type | Category | Cardinality | Description | Data type |
|---|---|---|---|---|---|
| ServiceGuideDelivery Descriptor | E | M | 1...N | The Service Guide Delivery Descriptor Contains the following sub-element: DescriptorEntry | |
| DescriptorEntry | E1 | M | 1...N | Contains: GroupingCriteria Transport AlternativeAccessURL ServiceGuideDeliveryUnit | |
| GroupingCriteria | E2 | O | 0...1 | Specifies criteria for grouping of ESG fragments Contains: TimeGroupingCriteria GenreGroupingCriteria | |
| TimeGroupingCriteria | E3 | O | 0...1 | Specifies period of time the DescriptorEntry describes Contains: StartTime EndTime | |
| StartTime | A | M | 1 | Start of the time period this DescriptorEntry declares ESG fragments for | NTP time as unsignedInt (32 bits) |
| EndTime | A | M | 1 | End of the time period this DescriptorEntry declares fragments for | NTP time as unsignedInt (32 bits) |
| GenreGroupingCriteria | E3 | O | 0...1 | Specifies classification of services/content associated with ESG fragments in this SGDU | Integer |
| Transport | E2 | O | 0...1 | Pointer to the transport session delivering the ESG fragments within SGDU announced in this DescriptorEntry Contains: IpAddress Port SrcIpAddress SessionID | |
| IpAddress | A | M | 1 | Destination IP address of target delivery session | String |
| Port | A | M | 1 | Destination port of target delivery session | unsignedShort (16 bits) |
| SrcIpAddress | A | O | 0...1 | Source IP address of the delivery session | String |
| SessionID | A | M | 1 | Identifier of target delivery session | unsignedShort (16 bits) |
| AlternativeAccessURL | E2 | O | 0...N | Alternative URL for retrieving the SGDUs via the interaction channel | AnyURI |
| ServiceGuideDeliveryUnit | E2 | M | 1...N | Group of fragments Contains: transportObjectID validFrom validTo Contains Fragment sub-element | |
| transportObjectID | A | O | 0...1 | Transport object ID of the SGDU carrying the declared fragments within this FragmentGroup | unsignedInt (32 bits) |
| validFrom | A | O | 0...1 | First moment of time this group of ESG fragments is valid. | NTP time as unsignedInt (32 bits) |
| validTo | A | O | 0...1 | Last moment of time this group of ESG fragments is valid | NTP time as unsignedInt (32 bits) |
| Fragment | E3 | M | 1...N | Declaration of ESG fragment available over broadcast channel Contains: id | |

-continued

| Name | Type | Category | Cardinality | Description | Data type |
|---|---|---|---|---|---|
| | | | | version validFrom validTo Type | |
| id | A | M | 1 | Identifier of the announced ESG fragment | unsignedInt |
| version | A | M | 1 | Version of the announced ESG fragment | unsignedByte (8 bits) |
| validFrom | A | O | 0...1 | First moment when fragment is valid. | NTP time as unsignedInt (32 bits) |
| validTo | A | O | 0...1 | Last moment when this fragment is valid | NTP time as unsignedInt (32 bits) |
| Type | A | M | 1 | Enumeration value designating schema or MIME type for fragment | unsignedInt (32 bits) |

Where the type can be an Element (E), an Attribute (A), a first level sub-element (E1), a second level sub-element (E2), or a third level sub-element (E3) and the category can be optional (O) or preferred/mandatory (M).

A delivery channel associated with the ESG fragments is also illustrated in the example of FIG. 3. The delivery channel 360 may deliver the transport object 300 and corresponding ESG fragment(s) 340. In this example, a plurality of channels such as IP-packet data streams can be used to deliver the service guide information to a subscriber terminal. One channel may provide parameters or attributes identifying the topology information of the ESG fragment (e.g., the announcement channel 370 illustrated in the example of FIG. 3). Topology information may include, for example, the contents of the channels (e.g., IP-packet data streams) or a listing of ESG fragments 340 in the container 305.

One or more additional channels may be used to deliver the ESG fragments 340. The ESG fragments 340 in their respective containers 305 may be delivered in their own transport object 300 as described. The containers 305 and transport objects 300 being delivered in channels (e.g., IP-packet data streams) such as a delivery channel 360 may be referred to by a corresponding announcement channel 370. In this example, the announcement channel 370 may refer to identifiers or descriptors (e.g., SGDD) to identify the corresponding containers 305 in the delivery channels 360 and their contents. A subscriber terminal can identify specific transport objects 300 (i.e., the completeness or contents of the transport object 300 or service guide) and filter out those ESG fragments 340 of certain transport objects 300 that are not desired. This results in more efficient delivery of ESG fragments 340. The channels for delivering the transport object 300 and containers 305 may be referred to as delivery channels (e.g., delivery channel 360).

In this example, the announcement channel 370 contains descriptors for each of the ESG fragments 340 in each of the associated delivery channels 360 such that the topology of the service guide is complete. For example, the announcement channel 370 may contain a File Delivery Table (FDT) that lists all SGDDs in a corresponding delivery channel. The SGDDS in the FDT that is delivered in the announcement channel describe all of the ESG fragments within the service guide. Further, the announcement channel may contain descriptors such as SGDDs that describe at least one session and at least one container within the session that carry the ESG fragments. By providing the descriptors such as the SGDDs corresponding to each of the SGDDs and ESG fragments in the corresponding delivery channel and by also providing descriptors to declare at least one session and at least one container that carries the corresponding ESG fragments, the subscriber terminal can receive information on the topology of the service guide. In one example, the FDT that contains the SGDDs that describe the SGDDs and ESG fragments in the corresponding delivery channel is complete such that every SGDD of the corresponding ESG fragments in the delivery channel is listed in the FDT. Thus, the set of ESG fragments declared by the SGDDs is exhaustive in that each ESG fragment is declared at least once and the entire set of ESG fragments 340, containers 305, and sessions is described in the announcement channel 370.

In another example, the descriptors for each of the ESG fragments, containers or sessions may be delivered in the same channel. In this example, the announcement channel 370 and the delivery channels 360 may be combined (not shown).

Figure 4:
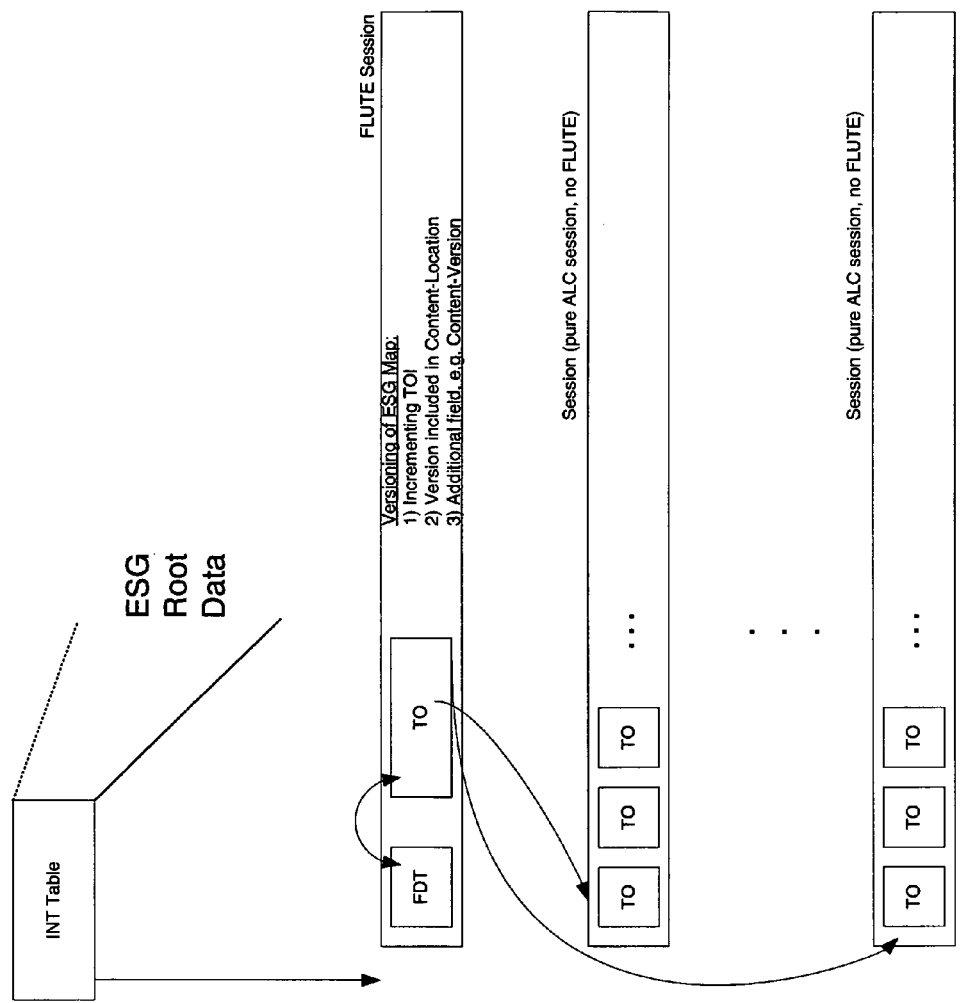
FIG. 4 illustrates examples of transporting single transport objects in which on or more illustrative embodiments of the invention may be implemented.

FIG. 4 illustrates an example of transmitting a plurality of single Transport Objects. As illustrated in FIG. 4, the Transport Objects (TO) of the current invention may be carried in, for example, FLUTE (File Delivery over Unidirectional Transport) sessions, or a pure Asynchronous Layered Coding (ALC) session. In the example of FIG. 4, the ESG Root Channel data, such as IP Address, port number and Transport Session Identifier (TSI), are announced in the IP/MAC Notification Table (INT Table) which may be, for example, carried in the SI/PSI stream in DVB-H as one of the SI tables of DVB-H. The FLUTE session of the ESG Root Channel comprises a File Delivery Table (FDT) of the session and one or more Transport Objects (TO). These Transport Objects in announcement carousels contain mapping between the different parts of ESGs and access parameters to the different ESG methods in which the ESG data is transmitted. The ESGs may differ from each other. For example, ESGs may be in different languages, genres or encoding.

Examples of access parameters may include, for example, IP Addresses, port numbers, TSIs, start and end times etc. The FLUTE session thus declares how the ESG data is distributed to different sessions. The TOs of the FLUTE session carrying this mapping data are described in the FDT of the FLUTE session. The ESG mapping data may be delivered in one or multiple TOs. The mapping can be made using XML Schema, plain ASCII text, Structured ASCII text such as multipart MIME or MIME headers, as binary with enumerated types or through various other means as is known in the art. The ESG data is in this example may be delivered in one or more TOs, which may be within pure ALC sessions, for example. The ESG data or parts of it may be delivered in some embodiments of the invention in one or more FLUTE sessions in addition to or instead of ALC sessions.

Figure 5:
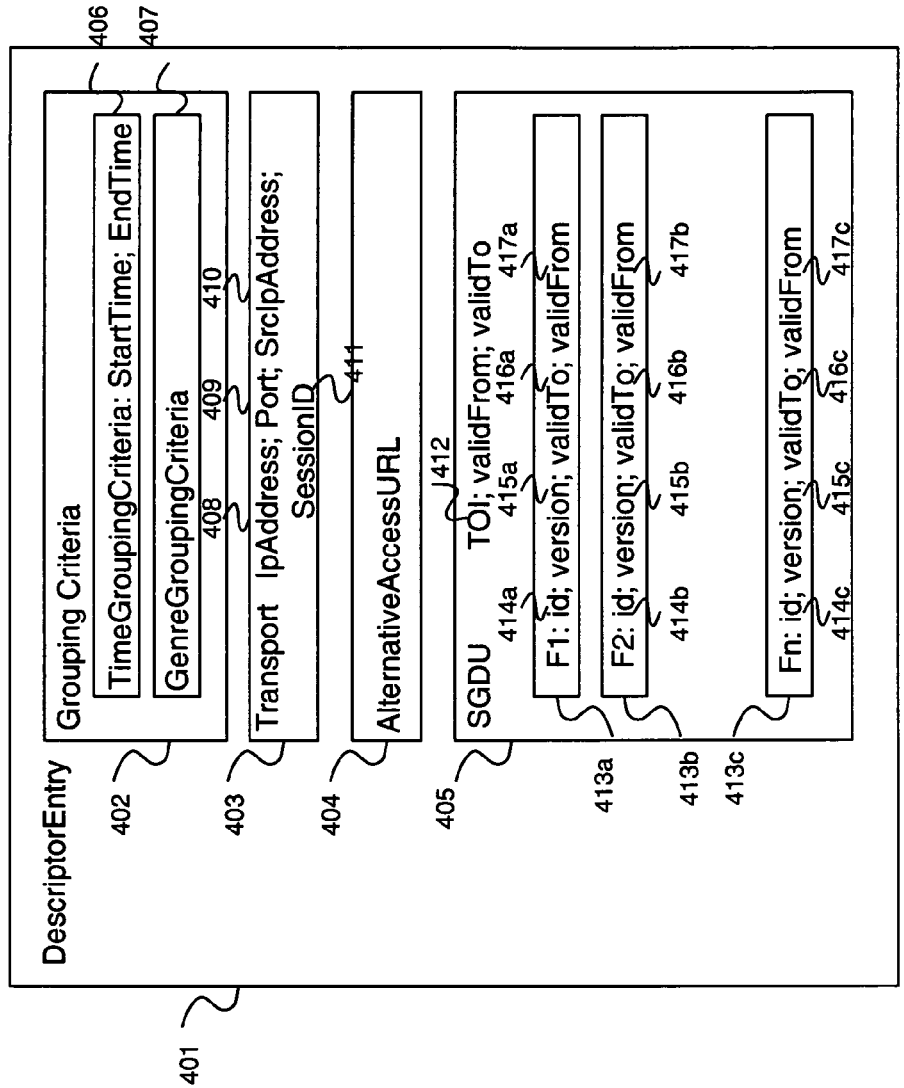
FIG. 5 illustrates a block diagram of an example of an SGDD providing a description of a corresponding one or more ESG fragments in which one or more illustrative embodiments of the invention may be implemented.

FIG. 5 is a block diagram illustrating an example of an SGDD providing a description of a corresponding one or more ESG fragments. In this example, DescriptorEntry 401 in the SGDD contains sub-elements GroupingCriteria 402, Transport 403, AlternativeAccessURL 404 and SGDU 405. GroupingCriteria 402 contains subelements TimeGroupingCriteria 406 (including attributes StartTime and EndTime) and GenreGrouping Criteria 407. Transport 403 contains attributes IpAddress 408, Port 409, SrcIpAddress 410, and SessionID 411. SGDU 405 contains attribute Transport Object Identifier (TOI) 412 which indicates which Transport Object the ESG fragments are transported in. Each of the ESG fragment declarations 413a-c (F1, F2, . . . Fn, in this example) are indicated in the SGDU 405 which also indicates attributes such as an ID 414a-c of a corresponding ESG fragment (e.g., id or frag_id), version 415a-c of the ESG fragment (e.g., version or frag_version), validTo 416a-c and validFrom 417a-c of the ESG fragment.

In this example, a group of ESG fragments that are declared in ESG fragment declarations 413 is sent to a receiver within a transport object. The transport object is identified by the attribute transport object identifier (TOI) 412 in sub-element SGDU 405 and the transport attributes (408, 409, 410, 411) in sub-element Transport 403. The corresponding SGDD informs the receiver of the transport of the group of ESG fragments that are declared in ESG fragment declarations 413.

By using SGDDs, a subscriber terminal can determine the completeness of a service guide. A subscriber terminal may further identify desired ESG fragments or out-dated ESG fragments and receive or modify stored fragments accordingly. For example, a SGDD may declare a group of ESG fragments with a pointer. The pointer may indicate a corresponding delivery session. In this example, each of the ESG fragments declared by the SGDD are related to each of the other declared ESG fragments. The relationship of the ESG fragments may be based on a variety of factors. For example, the GroupingCriteria element of the SGDD may indicate the criteria of grouping of the included ESG fragments. Thus, in one example of an aspect of the present invention, a well-defined and unambiguous subset of a service guide may be identified in which the group of ESG fragments in the subset are related by a particular criterion.

The announcement channel may contain an FDT that may provide delivery channel identifier information. For example, a delivery channel may contain transport objects and corresponding ESG fragments. Each of these ESG fragments may have a corresponding parameter or parameters such as SGDDs that can describe and/or identify the ESG fragments as well as desired characteristics of the ESG fragments. The SGDDs that describe and/or identify the ESG fragments in the delivery channel may also be listed in an FDT in the announcement channel so that a subscriber terminal can identify ESG fragments and can be informed of the content and characteristics of the ESG fragments from the information provided in the announcement channel. In one example, the FDT in the announcement channel provides a listing of all SGDDs in the corresponding delivery channel. By providing a list of all of the SGDDs and corresponding ESG fragments in the delivery channel, each ESG fragment is declared at least once. Therefore, there are no undeclared ESG fragments in the delivery channel and the set of ESG fragments that is declared is complete and unambiguous.

Figure 6:
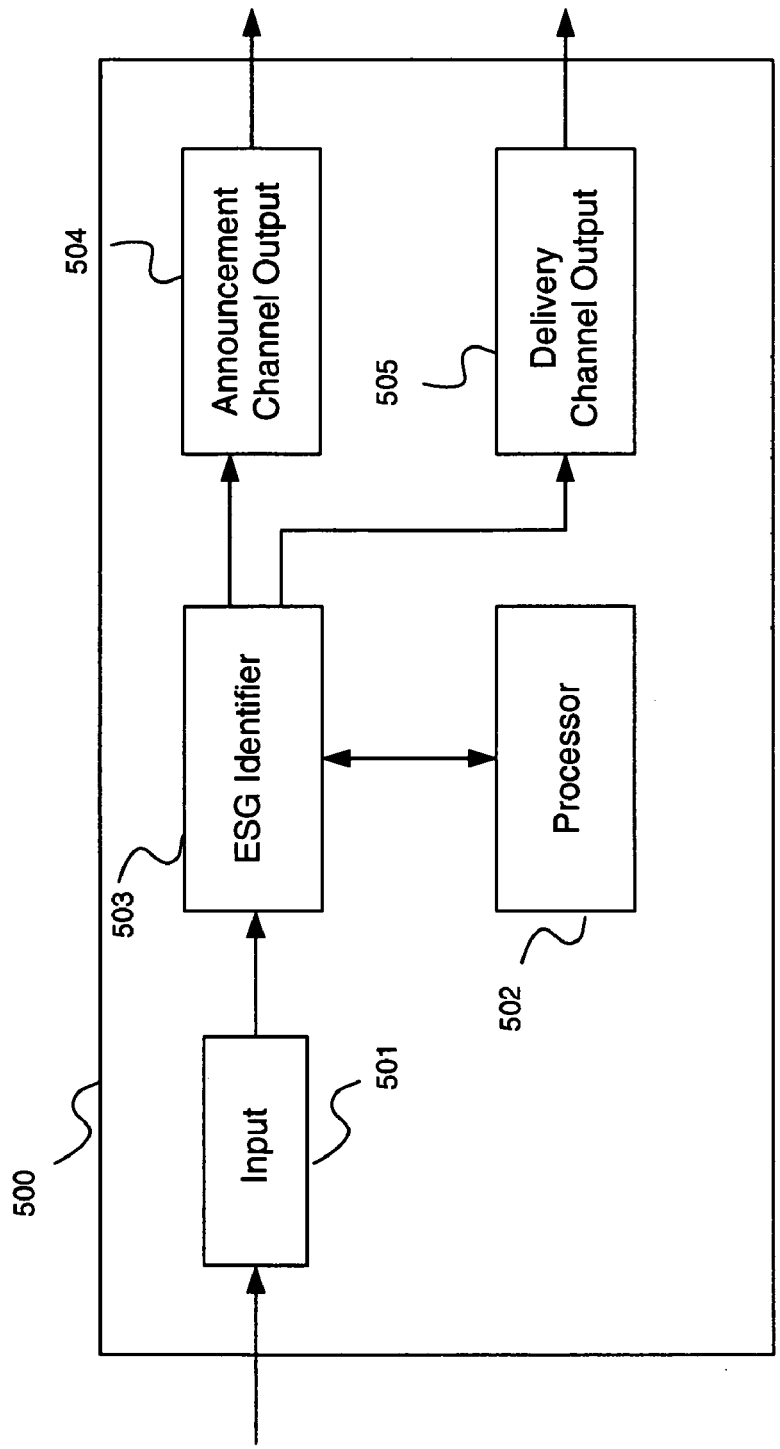
FIG. 6 illustrates a partial block diagram of an example of a transmitter in which one or more illustrative embodiments of the invention may be implemented.

FIG. 6 is a partial block diagram illustrating an example of a transmitter according to one aspect of the present invention. In this example, the transmitter 500 contains an input 501. The input 501 may be configured to receive data and/or metadata or other information that may be transmitted as an ESG fragment or transmitted using an ESG fragment transportation mechanism. The transmitter 500 may further include a processor 502 for processing the ESG fragment containing said data, metadata and/or other information received at the input 501. For example, the processor 502 may process the ESG fragment formed from received data at the input 501 to control an ESG identifier 503 to determine the topology of the ESG fragment such as the data content of the data streams. The processor 502 may also determine a list of ESG fragments in the transmission.

As FIG. 6 illustrates, the ESG identifier module 503 may determine the topology of the ESG fragment and prepare the ESG fragments for delivery on a delivery channel. The topology information may be, for example, created at a transmitter and transmitted to a receiver or subscriber terminal. The topology information may also be used for controlling transmission in announcement and delivery channels. Parameters such as SGDD may be output on an announcement channel via the announcement channel output 504. The parameters (e.g., SGDD) may be used to identify or describe the topology of the ESG fragments as described in more detail below. Also, the transmitter 500 may include a delivery channel output 505. The delivery channel output 505 can output the ESG fragments in containers within a transport object. The ESG fragments, containers and transport object in the delivery channel may be referred to by the parameters in delivered in the announcement channel.

Figure 7:
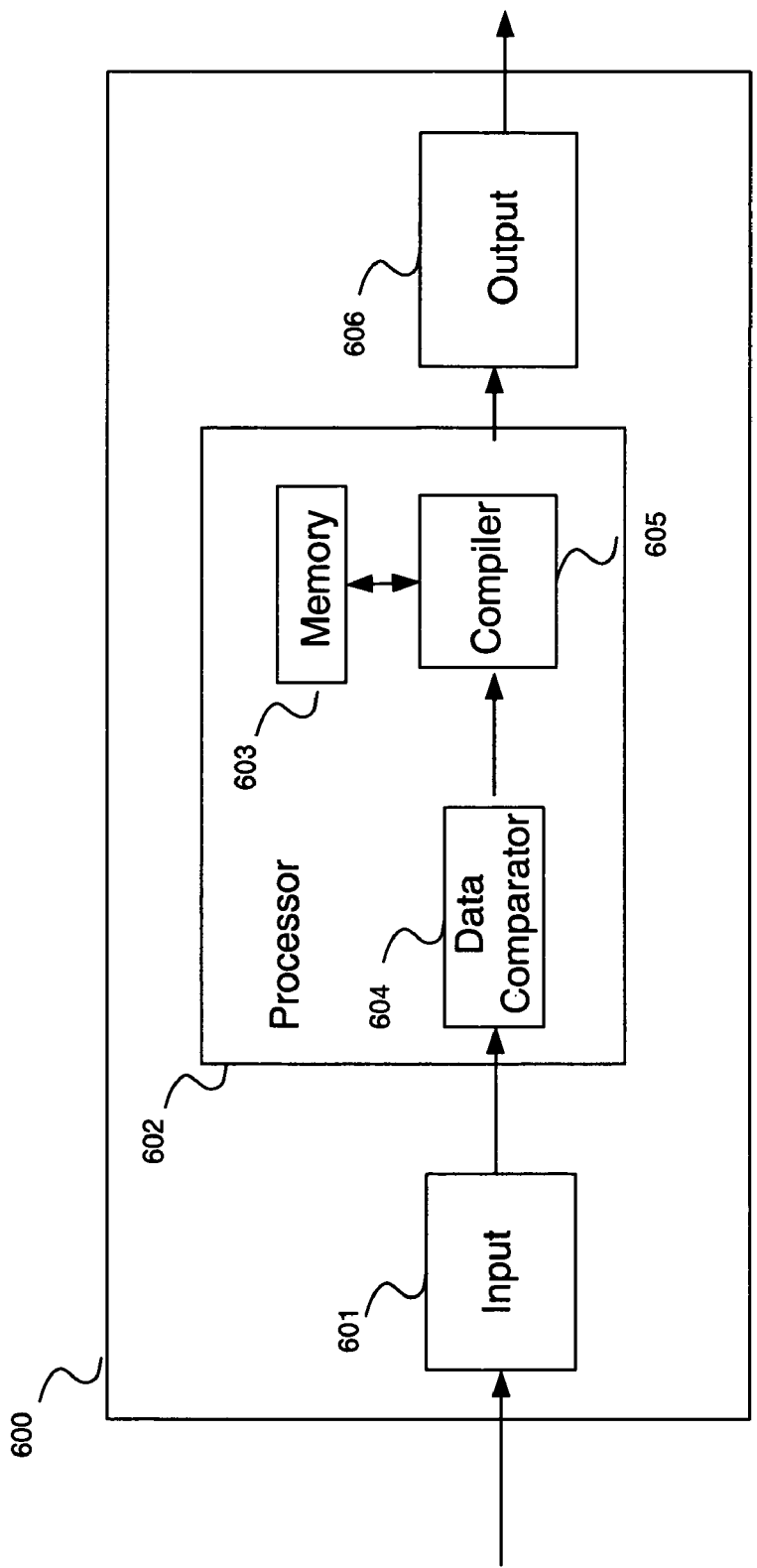
FIG. 7 illustrates a partial block diagram of an example of a receiver in which one or more illustrative embodiments of the invention may be implemented.

FIG. 7 is a partial block diagram illustrating an example of a receiver according to an aspect of the present invention. The receiver or subscriber terminal 600 may include an input 601 for receiving data associated with ESG fragments of a service guide. For example, the input 601 of the receiver 600 may receive an FDT containing SGDDs corresponding to ESG fragments. The FDT may be received in an announcement channel and may contain the SGDDs of ESG fragments received in a delivery channel. Hence, the input 601 may receive data in one or more channels of delivery (e.g., IP data streams).

The receiver 600 may further include a processor 602 for processing the input data received at the input 601 and determining attributes or elements that indicate ESG fragments received in a delivery channel. For example, the processor 602 may access a memory 603 in the receiver 600 to obtain SGDDs stored therein. The SGDDs stored in the memory 603 may correspond to previously received ESG fragments. The SGDDs stored in the memory 603 may be compared to the SGDDs received in the FDT at the input 601. For example, the comparison may be accomplished in a data comparator 604. In this example, the data comparator 604 is within the processor 602, however, the data comparator 604 may also be separate from the processor 602, if desired. If an SGDD received in the FDT at input 601 matches an SGDD stored in memory 603, then the SGDD has been previously received. In this case, the SGDD need not be received again at the receiver 600. If an SGDD received in the FDT at the input 601 does not match any of the SGDDs stored in the memory 603, then the SGDD is included in a list of SGDDs that correspond to ESG fragments that needs to be received that can be compiled by a compiler 605. The ESG fragments corresponding to the SGDDs on the list from the compiler 605 are processed by the processor 602 to determine the ESG fragments associated with the SGDDs to be received at the receiver 600. For example, if an SGDD on the list corresponds to a set of ESG fragments within a transport object, the receiver can determine any subset of ESG fragments from the set of ESG fragments to be received based on the data comparator 604 and the compiler 605. Likewise, a set of ESG fragments to be deleted or to be designated as invalid may be determined. These processes are described in more detail and in specific examples below.

The SGDDs received at the receiver 600 from the received FDT and/or SGDDs in memory 603 that are to be updated or deleted and/or corresponding ESG fragments can be stored in the memory 603. This process is described in more detail below and in the specific examples provided herein. Thus, the results may be displayed at the receiver 600 through an output 606, if desired.

Thus, in an example of the present invention, a subscriber terminal or receiver can receive desired or needed ESG fragments or portions of ESG fragments. For example, portions of ESG fragments that may be missing in the terminal that are desired or required can be received at the terminal through the transport object. At the same time, ESG fragments or portions of ESG fragments that are not needed are not received. In this method, the terminal can identify the completeness of the service guide or the content of the service guide and receive (or update) only the needed ESG fragments.

In this example, the subscriber terminal or receiver can maintain a list of delivery descriptors in memory. This list can be compared to delivery descriptors in subsequently received information in an announcement channel such as information corresponding to subsequently received ESG fragments and transport objects. These delivery descriptors in received information may include SGDDs listed in a File Delivery Table (FDT), for example. If the terminal determines based on the comparison that ESG fragments or portions of ESG fragments are missing (i.e., not found in the list of delivery descriptors in the memory in the terminal) or have been updated (i.e., presently out of date), the terminal can receive the missing ESG fragments or portions of ESG fragments. Also, the terminal may determine the location of each fragment in order to retrieve the desired information. Thus, the terminal may retrieve the precise lacking (or updated) information.

Figure 8:
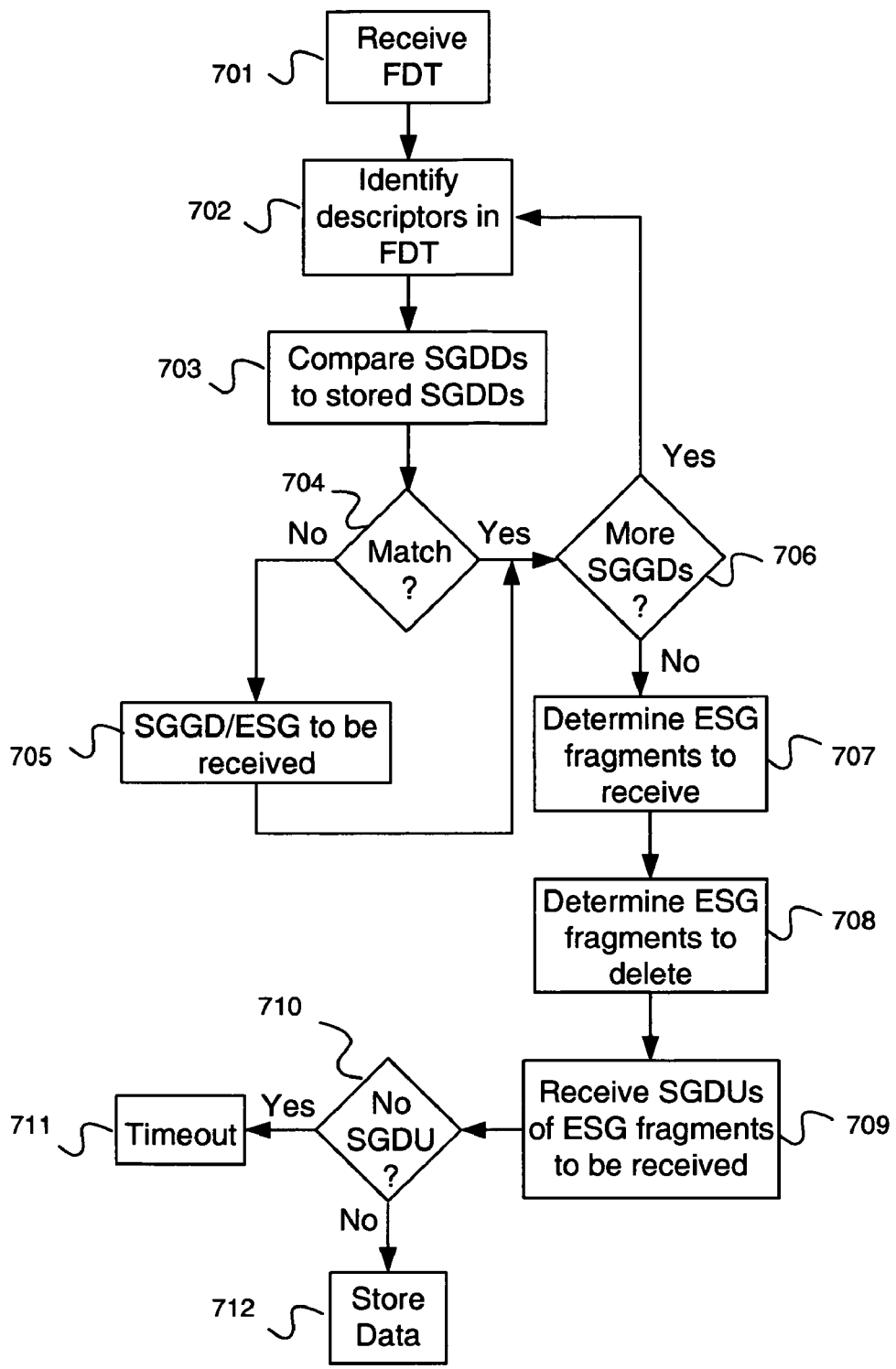
FIG. 8 illustrates a flow chart of an example of identifying service guide completeness in which one or more illustrative embodiments of the invention may be implemented.

FIG. 8 illustrates an example of identifying service guide completeness according to an aspect of the present invention. In this example, a subscriber terminal receives information in an announcement channel (STEP 701). The announcement channel may contain a File Delivery Table (FDT) which may contain one or more SGDDs. The SGDDs may identify or describe ESG fragments in a corresponding delivery channel. In step 702, an SGDD is identified and compared to stored SGDDs in the subscriber terminal in STEP 703. The subscriber terminal may include a memory in which SGDDs identifying ESG fragments are stored and compared with SGDDs that are subsequently received with other ESG fragments. If the SGDD received with the FDT in the announcement channel corresponds or matches a stored SGDD (the "YES" branch of STEP 704), then the corresponding ESG fragment is already received at the subscriber terminal. In one example, SGDDs identifying the ESG fragment and the version of the ESG fragment match the corresponding SGDDs stored in memory. This indicates that the ESG fragments associated with the SGDDs need not be stored because the ESG fragment has already been received and stored at the subscriber terminal or receiver.

In this case, the next SGDD is identified in the FDT for identification and processing (the "YES" branch of STEP 706). If a matching SGDD is not found in the memory of the subscriber terminal (the "NO" branch of STEP 704), then the SGDD received with the FDT in the announcement channel is not stored and the ESG fragment may have been deleted or updated, for example. Thus, the subscriber terminal receives the SGDD in the FDT (STEP 705).

When all the received SGDDs associated with the incoming ESG fragments have been matched with stored SGDDs (the "NO" branch of STEP 706), a set of ESG fragments that are to be received is determined (STEP 707). The set of ESG fragments to be received are determined based on the determined set of SGDDs that the subscriber terminal has not previously received and stored or SGDDs. Also, SGDDs corresponding to ESG fragments that are outdated or that have become obsolete (i.e., those SGDDs that do not match with previously stored SGDDs) can be determined (STEP 708). These obsolete ESG fragments may be, for example, deleted from memory. Thus, based on the SGDDs that are determined to not have previously been received at the subscriber terminal and stored therein or have become obsolete, specific sets of ESG fragments can be determined to be missing (STEP 708). The SGDD can provide information corresponding to the location of each ESG fragment such that retrieval of desired portions of an ESG fragment can be performed.

In this example, the receiver or subscriber terminal may receive the ESG fragments determined to be received. The ESG fragments may be received in groups such as in an SGDU. If the ESG fragments have been deleted, then the SGDU may be missing. In this case (the "YES" branch of STEP 710), the subscriber terminal can wait for a predetermined period of time. If the SGDU is still missing, then the subscriber terminal may time out (STEP 711). If the SGDU is received, then the corresponding desired ESG fragment(s) and associated descriptors are stored in memory (STEP 712).

In another example, the announcement channel may provide an SGDD indicating a specific container in an accompanying delivery channel but the delivery channel does not contain the declared container or ESG fragment. This may occur under a variety of conditions. For example, if the delivery channel is updated before the announcement channel is updated, the announcement channel may contain outdated information. Hence, under these conditions, the announcement channel continues to indicate a declared container or ESG fragment until the announcement channel is updated.

Conversely, if an ESG fragment received previously has become obsolete for any reason, then the ESG fragment is no longer part of the system. For example, the subscriber terminal may identify an SGDD in an announcement channel that declares a container that is not included in a corresponding delivery channel such as if the container has been deleted from the delivery channel but not yet updated in the announcement channel. In these examples in which the announcement channel contains non-updated information that does not correspond to the contents of the delivery channel, the subscriber terminal may end in timeout. In an example of timeout, the subscriber terminal may wait for the referenced container in the delivery channel (i.e., listens to the delivery channel) which does not appear. In one example, the subscriber terminal times out and may return to the announcement channel to verify the topology of the information regarding the container. This verification may be indicated, for example, by the next description. This may be accomplished by, for example, examining the contents of the announcement channel to verify the SGDDs received in an FDT and the corresponding ESG fragments and attempting to retrieve the indicated container again. Thus, the subscriber terminal may attempt to retrieve the container again or may report an error condition, for example.

In another example, the subscriber terminal may attempt to retrieve the container a predetermined number of times prior to reporting an error condition. The number of times the subscriber terminal attempts to retrieve the container prior to reporting an error condition may be based on the subscriber terminal implementation, for example.

Figure 9:
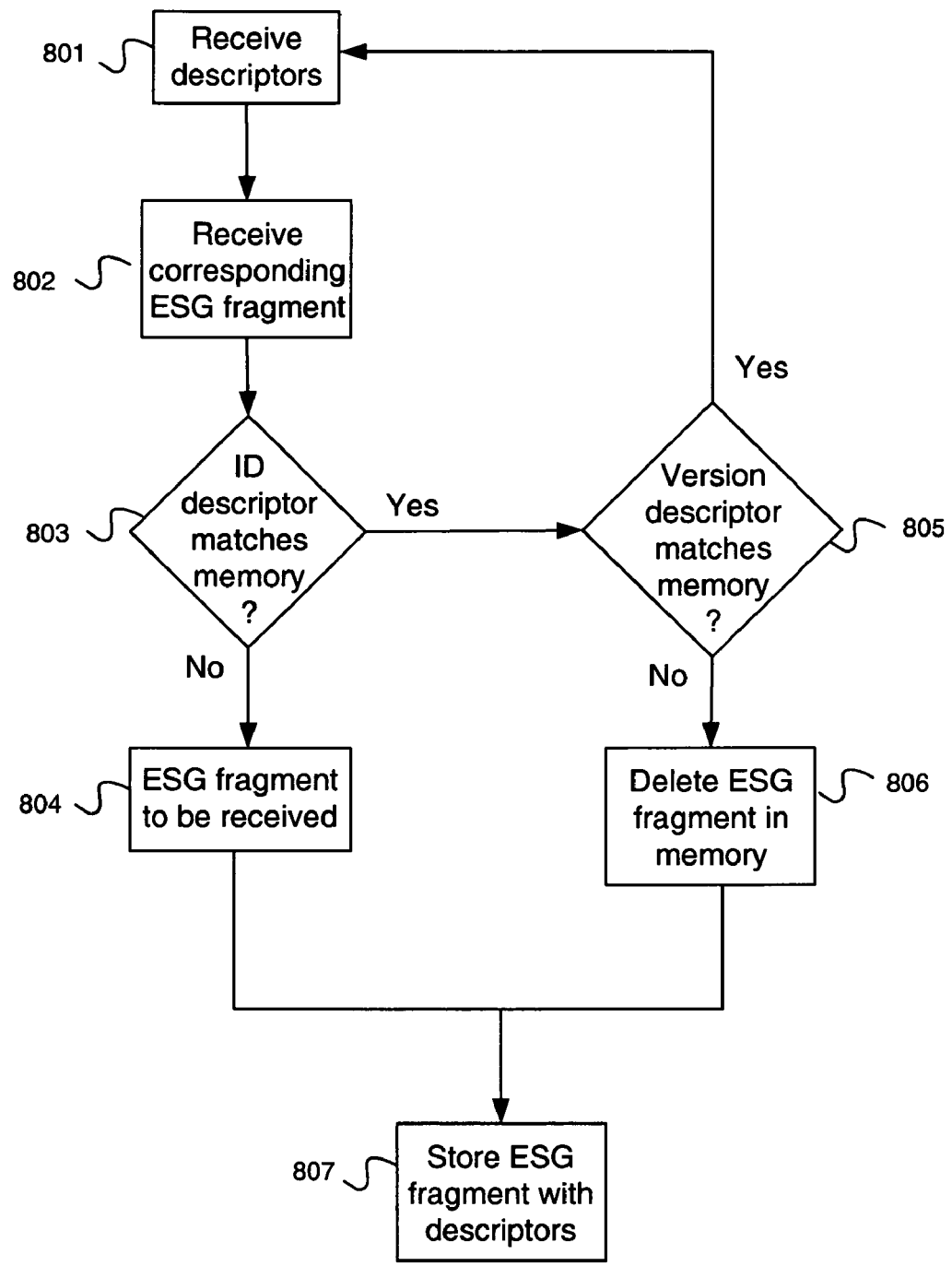
FIG. 9 illustrates a flow chart of an example of receiving an ESG fragment and corresponding identifiers in which one or more illustrative embodiments of the invention may be implemented.

FIG. 9 is a flowchart illustrating another example of receiving an ESG fragment. In this example, a subscriber terminal may receive descriptors associated with an ESG fragment (STEP 801). The descriptors may include, for example, an identification or identifier descriptor for the ESG fragment that identifies the specific ESG fragment. Also, the descriptors may include a version descriptor that describes the present version of the ESG fragment being transmitted. For example, a lower value of a version descriptor may represent that the ESG fragment being transmitted and delivered is not a recent version (i.e., is an outdated version). In STEP 802 of this example, the descriptors are received at the subscriber terminal with the corresponding ESG fragment which is also received. The subscriber terminal may contain in memory descriptors of previously received and stored ESG fragments. The stored descriptors may be compared with the descriptors received in the transmission (STEP 803). If, for example, the identifier descriptor for the incoming ESG fragment does not match any stored identifier descriptor, then the incoming ESG fragment has not been previously received and stored. In this case, the incoming ESG fragment can be deemed an ESG fragment to be received (STEP 804). If the identifier descriptor for the incoming ESG fragment matches a stored identifier descriptor (STEP 803), then a version of the ESG fragment has been previously received and stored. In this case, the version of the stored ESG fragment is compared to the version of the incoming ESG fragment (STEP 805). If the version descriptor of the incoming ESG fragment does not match the version descriptor stored in memory (the "NO" branch of STEP 805), then the stored version of the ESG fragment is not the same as the version of the incoming ESG fragment. If the version of the incoming ESG fragment is greater than the version of the stored ESG fragment, then the ESG fragment has been updated since last stored at the subscriber terminal. Thus, the currently stored ESG fragment represents an outdated version of the ESG fragment. The subscriber terminal may delete the corresponding ESG fragment from memory as being outdated (STEP 806). Alternatively, if the ID descriptor and the version descriptor of the incoming ESG fragment match the ID descriptor and the version descriptor, respectively, of the stored ESG fragment (the "YES" branch of STEP 805), then the incoming ESG fragment has been previously received and stored. The subscriber terminal may save resources by not storing the incoming ESG fragment again.

If the ID descriptor does not match a stored ID descriptor of an ESG fragment or if the ID descriptor does match a stored ID descriptor but the corresponding version descriptor of the incoming ESG fragment is greater than the version descriptor of the stored ESG fragment, then the incoming ESG fragment and associated descriptors are stored in memory (STEP 807).

For illustration purposes, a specific example of subscriber terminal behavior is described. The present description is merely an illustration of one example of the present invention and not intended to limit the present invention. In one example, an FDT is received on a service guide entry point channel. For example, the FDT may be received in an announcement channel that carries SGDDs associated with ESG fragments. The subscriber terminal can evaluate the SGDDs received in the FDT and determine if the SGDDs were previously received. For example, the subscriber terminal can match the received SGDDs in the FDT with previously stored SGDDs at the subscriber terminal. As an illustrative example, the set of SGDDs received in the FDT may be {SGDD-TOI 5; SGDD-TOI 10; SGDD-TOI 11; SGDD-TOI 77}. This set of SGDDs may be referred to as "$L_D$". The subscriber terminal may access stored SGDDs in memory and determine that the stored SGDDs include {TOI 5; TOI 11; TOI 77}. This set of stored SGDDs may be referred to as "$L_P$". $L_D$ is compared with $L_P$ to determine the set of SGDDs to be received in the present transmission. In this example, the set of SGDDs to be received is {TOI 10}, i.e., the TOI that is received in the FDT but not previously stored in memory at the subscriber terminal. The set of SGDDs to be received in the present transmission may be referred to as $L_R$.

As a further illustration of the present invention, the ESG fragments associated with the SGDDs are evaluated. As described above, $L_P$ in this example includes the set of SGDDs which correspond to TOI 5, TOI 11 and TOI 77 and $L_R$ includes the set of SGDDs which correspond to TOI 10. If the ESG fragments contained in the respective TOIs are as follows:

TOI 5: $(F_1V_2, F_7V_1, F_3V_5)$
TOI 11: $(\ldots, F_iV_j, \ldots)$
TOI 77: $(\ldots, F_5V_3, \ldots)$, and
TOI 10: $(F_1V_2, F_7V_4, F_5V_4)$, then, in comparison of $L_P$ and $L_R$, the subscriber terminal may determine the set of ESG fragments to be received. In this example, the set of ESG fragments to be received is $F_7V_4$ because $F_7V_4$ is an ESG fragment that is contained in the set of ESG fragments to be received but is not presently described by the stored SGDDs.

Also, the subscriber terminal may determine the set of ESG fragments to be deleted. For example, TOI 77, the SGDD of which is stored in memory at the subscriber terminal in the present invention, contains ESG fragment $F_5V_3$. TOI 10, the SGDD of which is received in the FDT of the present transmission, contains ESG fragment $F_5V_4$. In this example, ESG fragment $F_5V_3$ may include an associated validity start time and/or validity end time such that from ESG fragment $F_5V_3$ the validity of ESG fragment $F_5V_3$ may be determined. Thus, a time stamp on the ESG fragment $F_5V_3$ may indicate that the ESG fragment $F_5V_3$ has expired. If ESG fragment $F_5V_3$ has expired, then the subscriber terminal may delete ESG fragment $F_5V_3$ and receive ESG fragment $F_5V_4$.

As described in this example, an ESG fragment may have an associated validity start time and/or validity end time. Either of these parameters may vary over time and may vary over different versions of the same ESG fragment. For example, one version of an ESG fragment may have a particular validity start time and validity end time whereas a subsequent version of the same ESG fragment may have a different validity start time and/or validity end time. In this way, the life span of the ESG fragment may vary (either increase or decrease) based on current needs.

In another example, a subscriber terminal may receive a set of ESG fragments in a first location as described in the above examples. If the subscriber re-locates to a second location that is remote from the first location such that the network area changes, then the ESG fragments previously received in the first location may not all be declared in the second location. As an example, if a subscriber in a first city receives a set of ESG fragments, then moves to a second city and if in the second city, a set of ESG fragments declared in the second city is not the complete set of ESG fragments declared in the first city (i.e., the set of ESG fragments declared in the second city is a subset of the ESG fragments declared in the first city), then there will be certain ESG fragments in the second city that will appear to be "missing" in the second city (because the subscriber terminal has "extra" ESG fragments associated with the first city but not the second city). In one example, the subscriber terminal may designate the "extra" ESG fragments as "deleted" because the "extra" ESG fragments are not within the set of ESG fragments of the second city. In another example, the subscriber terminal designates the extra fragments as "invalid" (and not "deleted") based on the validity parameters described above. In this way, the subscriber terminal may retain the ESG fragments for when the subscriber returns to the first city when the "invalid" ESG fragments may be declared "valid" again. In yet another example, the "extra" ESG fragments in the second city may be set to a certain lifespan such that when the lifespan expires, the corresponding ESG fragment(s) may be deleted in the subscriber terminal.

The present invention includes any novel feature or combination of features disclosed herein either explicitly or any generalization thereof. While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

What is claimed is:

1. An apparatus comprising:
   at least one processor; and
   at least one memory including computer program code,
   the at least one memory and the computer program code configured to, with the at least one processor, cause the apparatus to perform at least the following,
   receive data to be included in an Electronic Service Guide (ESG) fragment for transmission, wherein the ESG fragment specifies information on one or more services and how the services can be accessed;
   determine topology information of the ESG fragment, wherein the topology information specifies current content of the ESG fragment; determine to transmit the ESG fragment on a first channel according to the determined topology information; and
   determine to transmit at least one descriptor including the determined topology information on a second channel according to the determined topology information,
   wherein the at least one descriptor on a list of descriptors is not received over the first channel if the at least one descriptor matches at least one descriptor stored in a memory.

2. The apparatus of claim 1 wherein the topology information includes a parameter indicating the arrangement of the ESG fragment within the transmission.

3. The apparatus of claim 2 wherein the topology information further includes a parameter indicating the identity of the ESG fragment.

4. The apparatus of claim 2 wherein the topology information includes a parameter indicating the version of the ESG fragment.

5. An apparatus comprising:
   at least one processor; and
   at least one memory including computer program code,
   the at least one memory and the computer program code configured to, with the at least one processor, cause the apparatus to perform at least the following,
   receive a list of descriptors including at least one descriptor corresponding to at least one Electronic Service Guide (ESG) fragment, wherein the one ESG fragment specifies information on one or more services and how the services can be accessed, and the at least one descriptor includes topology information specifying current content of the one ESG fragment;
   determine to store at least one descriptor of at least one previously received ESG fragment;
   compare the at least one descriptor in the list of descriptors with previously stored descriptors;
   determine whether the ESG fragment is to be received at the apparatus based on the comparison; and
   determine that an ESG fragment corresponding to the at least one descriptor on the list of descriptors is not to be received if the at least one descriptor on the list of descriptors matches at least one descriptor stored in the memory.

6. The apparatus of claim 5 wherein the list of descriptors is received on an announcement channel.

7. The apparatus of claim 6 wherein the list of descriptors is received on an announcement first channel and the ESG fragment corresponding to at least one descriptor on the list of descriptors is received on a delivery channel.

8. The apparatus of claim 5 wherein the apparatus is further caused to receive an ESG fragment corresponding to at least one descriptor on the list of descriptors.

9. The apparatus of claim 5 wherein the apparatus is further caused to determine that an ESG fragment corresponding to the at least one descriptor on the list of descriptors is to be received if the at least one descriptor on the list of descriptors does not match at least one descriptor stored in memory.

10. The apparatus of claim 5 wherein the apparatus is further caused to determine that an ESG fragment corresponding to the at least one descriptor stored in the memory is to be deleted if the at least one descriptor stored in memory does not match at least one descriptor on the list of descriptors.

11. The apparatus of claim 5 wherein the list of descriptors includes an identifier descriptor and a version descriptor corresponding to at least one ESG fragment and the at least one descriptor stored in memory includes at least one identifier descriptor and a corresponding version descriptor corresponding to a stored ESG fragment.

12. The apparatus of claim 11 wherein the apparatus is further caused to determine that an ESG fragment corresponding to the identifier descriptor and the version descriptor on the list of descriptors is to be received if the identifier descriptor and the version descriptor on the list of descriptors is different from an identifier descriptor and corresponding version descriptor stored in memory.

13. The apparatus of claim 12 wherein the apparatus is further caused to determine that an ESG fragment corresponding to the identifier descriptor and the version descriptor on the list of descriptors is not to be received if the identifier descriptor does not match an identifier descriptor stored in memory and that an ESG fragment in memory corresponding to the identifier descriptor and that the corresponding version descriptor stored in memory is to be deleted if the identifier descriptor stored in memory matches an identifier descriptor on the list of descriptors but the version descriptor corresponding to the identifier descriptor stored in memory is less than the version descriptor corresponding to the identifier descriptor on the list of descriptors.

14. The apparatus of claim 13 wherein the ESG fragment determined to be received is stored in the memory with corresponding identifiers and the ESG fragment determined to be deleted from the memory and corresponding identifiers are removed from the memory.

15. A method comprising:
receiving a list of descriptors on an announcement channel;
receiving an Electronic Service Guide (ESG) fragment on a delivery channel, the ESG fragment corresponding to at least one descriptor in the list of descriptors, wherein the ESG fragment specifies information on one or more services and how the services can be accessed, and the at least one descriptor includes topology information specifying current content of the ESG fragment;
comparing the at least one descriptor in the list of descriptors with descriptors previously stored in memory;
determining, by a processor, whether the ESG fragment is to be received based on the comparing step; and
determining, by the processor, to store the corresponding at least one descriptor if the ESG fragment is determined to be received based on the determining step,
wherein the comparing step comprises determining that the at least one descriptor in the list of descriptors is the same as a descriptor stored in memory; and
wherein the step of determining whether the ESG fragment is to be received comprises determining that the ESG fragment is not to be received.

16. The method of claim 15 wherein the comparing step comprises determining that the at least one descriptor in the list of descriptors is different from the descriptors previously stored in memory and wherein the step of determining whether the ESG fragment is to be received comprises determining that the ESG fragment is to be received.

17. The method of claim 16 wherein the storing step comprises storing the ESG fragment and the at least one descriptor corresponding to the ESG fragment in memory.

18. The method of claim 15 wherein the list of descriptors comprises an identifier descriptor and a version descriptor corresponding to the received ESG fragment.

19. The method of claim 18 wherein the comparing step comprises determining whether the identifier descriptor and the version descriptor corresponding to the received ESG fragment matches an identifier descriptor and a corresponding version descriptor in the memory.

20. The method of claim 19 wherein the comparing step comprises determining that the identifier descriptor and the version descriptor corresponding to the received ESG fragment matches the identifier descriptor and the corresponding version descriptor in the memory and wherein the determining step comprises determining that the ESG fragment is not to be received.

21. The method of claim 19 wherein the comparing step comprises determining that the identifier descriptor of the received ESG fragment does not match the identifier descriptor in the memory and wherein the determining step comprises determining that the received ESG fragment is an ESG fragment to be received based on the comparing step.

22. The method of claim 19 wherein the comparing step comprises determining that the identifier descriptor of the received ESG fragment matches the identifier descriptor in the memory and the version descriptor corresponding to the identifier descriptor of the received ESG fragment is greater than the version descriptor corresponding to the identifier descriptor in the memory and wherein the determining step comprises determining that the ESG fragment corresponding to the identifier descriptor and corresponding version descriptor in the memory is to be deleted.

23. The method of claim 22 further comprising determining to delete an ESG fragment stored in memory responsive to the determining step, the ESG fragment stored in memory corresponding to the identifier descriptor and corresponding version descriptor in the memory.

24. The method of claim 15 further comprising receiving multiple ESG fragments on the delivery channel, wherein the list of descriptors on the announcement channel includes descriptors for each of the ESG fragments.

25. A non-transitory computer-readable storage medium carrying one or more sequences of one or more instructions which, when executed by one or more processors, cause an apparatus to at least perform the following steps:
receiving a list of descriptors at a subscriber terminal on a first channel, wherein at least one of the descriptors on the list of descriptors corresponds to a received Electronic Service Guide (ESG) fragment, the received ESG fragment being received on a second channel, wherein the received ESG fragment specifies information on one or more services and how the services can be accessed, and the at least one descriptor includes topology information specifying current content of the received ESG fragment;
determining whether the received ESG fragment is to be stored in memory based on comparing the descriptor corresponding to the received ESG fragment to descriptors previously stored in memory; and
determining to store the corresponding descriptor in memory based on the determining step,
wherein the comparing comprises determining that the corresponding descriptor is the same as a descriptor stored in memory; and
wherein the step of determining whether the ESG fragment is to be received comprises determining that the ESG fragment is not to be received.

26. The non-transitory computer-readable storage medium of claim 25 wherein the comparing comprises determining that the descriptor corresponding to the received ESG fragment is different from each descriptor stored in memory.

27. The non-transitory computer-readable storage medium of claim 25 wherein only a portion of the descriptor corresponding to the received ESG fragment is the same as a corresponding portion of a descriptor stored in memory and wherein the storing step comprises deleting an ESG fragment stored in memory and the corresponding portion of the descriptor stored in memory.

28. The non-transitory computer-readable storage medium of claim 27 wherein the portion of the descriptor corresponding to the received ESG fragment that is the same as the corresponding portion of the descriptor stored in memory comprises an identifier descriptor of the received ESG fragment.

29. The non-transitory computer-readable storage medium of claim 28 wherein the portion of the descriptor corresponding to the received ESG fragment that is different from the corresponding portion of the descriptor stored in memory comprises a version descriptor of the received ESG fragment.

30. The non-transitory computer-readable storage medium of claim 29 wherein the version descriptor in the portion of the descriptor corresponding to the received ESG fragment that is different from the corresponding portion of the descriptor stored in memory is greater than a corresponding version descriptor in the corresponding portion of the descriptor stored in memory.

31. The non-transitory computer-readable storage medium of claim 25 wherein the comparing comprises determining that the descriptor corresponding to the received ESG fragment is the same as a descriptor stored in the memory.

32. The non-transitory computer-readable storage medium of claim 25 wherein the apparatus is further caused to receive multiple ESG fragments on the second channel, wherein the list of descriptors on the first channel includes descriptors for each of the ESG fragments.

* * * * *